United States Patent [19]

Fähnrich et al.

[11] Patent Number: 4,588,925
[45] Date of Patent: May 13, 1986

[54] STARTING CIRCUIT FOR LOW-PRESSURE DISCHARGE LAMP, SUCH AS A COMPACT FLUORESCENT LAMP

[75] Inventors: Hans-Jürgen Fähnrich; Ulrich Roll, both of Munich, Fed. Rep. of Germany

[73] Assignee: Patent Treuhand Gesellschaft fur elektrische Gluhlampen GmbH, Munich, Fed. Rep. of Germany

[21] Appl. No.: 591,211

[22] Filed: Mar. 19, 1984

[30] Foreign Application Priority Data

Mar. 28, 1983 [DE] Fed. Rep. of Germany ....... 3311215

[51] Int. Cl.⁴ ............................................ H05B 39/00
[52] U.S. Cl. ...................................... 315/101; 315/99; 315/105; 315/107
[58] Field of Search ................. 315/99, 101, 105, 106, 315/107

[56] References Cited

U.S. PATENT DOCUMENTS

| | | | |
|---|---|---|---|
| 3,482,142 | 12/1969 | Cluett et al. | 315/105 |
| 3,643,127 | 2/1972 | Laupman | 315/101 |
| 3,746,919 | 7/1973 | Laupman | 315/101 |
| 3,924,155 | 12/1975 | Voegli | 315/105 |
| 4,460,848 | 7/1984 | Fahnrich et al. | 315/101 |

Primary Examiner—Harold Dixon
Attorney, Agent, or Firm—Frishauf, Holtz, Goodman & Woodward

[57] ABSTRACT

To provide for reliable starting of compact-type fluorescent lamps, or other discharge lamps difficult to start, a voltage divider which is formed only by serially connected capacitors (C1, C2) is connected across the lamp (L), the junction point (5) of the voltage divider being connected to a charging circuit formed by a resistor (R1) and a capacitor (C3). The junction (4) between the charging resistor and capacitor (R1, C3) is connected through a diac (D) to the trigger or gate electrode (3) of a triac (T) connected across the lamp. Preferably, the capacity relationship of each one of the capacitors (C1, C2) of the voltage divider to the trigger capacitor (C3) is between about 1:1 and 1:5, desirably about 1:3. The time constant formed by the charge circuit (R1, C3), preferably, is between about 4 to 6 milliseconds, so that the charge time of the trigger capacitor (C3) is sufficiently long to provide multiple starting pulses to the triac (T) at peak values. A circuit to provide for polarity independence (FIG. 2: G, R2) can be connected between the diac junction (4) and the charge capacitor (C3).

16 Claims, 2 Drawing Figures

STARTING CIRCUIT FOR LOW-PRESSURE DISCHARGE LAMP, SUCH AS A COMPACT FLUORESCENT LAMP

Reference to related application, assigned to the assignee of the present invention, by the inventors hereof: U.S. Ser. No. 326,498, filed Feb. 12, 1981, entitled "TRIAC STARTER", now U.S. Pat. No. 4,460,848, July 17, 1984, the disclosure of which is hereby incorporated by reference.

The present invention relates to a starting arrangement for low-pressure discharge lamps, particularly fluorescent lamps of the compact fluorescent lamp type, in which a diac is used to provide a trigger pulse to a triac serially connected with preheatable electrodes of the lamp.

BACKGROUND

It has previously been proposed to tap a voltage divider connected across the electrodes of a low-pressure discharge lamp, such as a fluorescent lamp, connect the tap point to a trigger capacitor and to a diac which controls the triggering or firing of the gate electrode of a triac. A terminal of the trigger capacitor is, additionally, connected to one of the main electrodes or main current-carrying path electrodes of the triac.

A circuit of this type is described, for example, in the referenced application Ser. No. 326,498, now U.S. Pat. No. 4,460,848 filed Feb. 12, 1981, by co-inventor Fahnrich hereof, and assigned to the assignee of the present application. The circuit of the referenced application Ser. No. 326,498 is particularly arranged and adapted to start low-pressure discharge lamps with extremely low starting voltages. The standard circuit arrangements for starting utilize a phase controlled starting circuit in which the voltage divider comprises a controllable or specifically set resistor and a capacitor. Phase-controlled circuits, including diacs and triacs, are used in many forms and arrangements to control the speed of motors or the like, for example in small home appliances, in industrial apparatus and the like. The circuit arrangement of the referenced application Ser. No. 326,498 includes a voltage divider and, additionally, a charge resistor and a trigger capacitor in addition to the variable resistor for phase angle control of the circuit. The variable resistor can be used to heat a thermistor used for turn-off of the starter circuit, connected parallel to the charge resistor and the trigger capacitor, in order to assist in the operation of the starting circuit under starting condition. The variable resistor may be replaced by a variable impedance element, for example a control capacitor which is frequency-dependent, or a voltage-dependent resistor. A noise suppression capacitor is connected in parallel to the triac which, in one embodiment particularly adapted for fluorescent lamps which are difficult to start, is formed as a capacitative voltage divider. One of the capacitors is bridged by a self-switching four-layer diode.

The circuit of the referenced application operates satisfactorily; it does require, however, a substantial number of circuit components. If the fluorescent lamp should not fire, the circuit will disconnect automatically when the voltage wave reaches or approaches a maximum. Further attempts at starting thus cannot be initiated inherently by the circuit.

THE INVENTION

It is an object to provide an ignition or firing circuit for low-pressure discharge lamps, particularly small or compact fluorescent lamps, or other fluorescent lamps which are difficult to start, in which starting is insured, and carried out reliably, without overloading or damaging the lamp. In other words, the lamp should be started gently; the circuit, further, should require as few components as possible and those should be capable of being retained in a small space, so that the circuit components can be integrated with a compact fluorescent lamp, for example in the socket or base portion thereof.

Briefly, the starter circuit uses a triac which is serially connected with the electrode filaments of the fluorescent lamp, triggered to conduction by a diac which is connected to the trigger or gate electrode of the triac with one terminal and to the junction point between an R/C charging circuit. The charging capacitor of the R/C charging circuit is connected to a main current carrying terminal of the triac. In accordance with a feature of the invention, the resistor of the R/C charging circuit is connected to the junction point of a purely and entirely capacitative voltage divider, formed of two capacitor units of approximately the same capacity value. Each one of the capacitor units may be formed by one capacitor element or a series circuit of several capacitors which, for some circuit structures, particularly in integrated circuit technology, may have some advantage. The capacitor units should have the same nominal capacity value; they need nnt be precisely matched, however, and "equal capacity value" as used herein with respect to a purely capacitative voltage divider, is deemed to merely mean that the nominal capacity values are the same, subject to usual manufacturing tolerances, however, and not requiring precise matching. The actual capacity values of the capacitor units, thus, may differ somewhat from each other, under customary commercial tolerence levels.

The circuit is particularly suitable for igniting discharge lamps which are, normally, difficult to fire, and particularly to discharge lamps which, lately, have been subject to intense developments in order to reduce the size of fluorescent lamps. Such fluorescent lamps are currently referred to as "compact fluorescent lamps" and may include fluorescent tubes of a diameter of about 1 cm or less, bent into U shape and suitable for screw-in mounting in ordinary "Edison" sockets.

The circuit provides a starter arrangement which results in rapid heating of the electrodes by comparatively high preheating current and subsequent reliable firing by high voltage peaks in both directions. The circuit can be built of few circuit components. It continuously provides voltage peaks at each voltage wave, regardless of polarity. It permits elimination of a four-layer diode in order to furnish high voltage pulses to the fluorescent lamps. It has been found, surprisingly, that the circuit permits use of capacitor units of only small capacity value—in the order of about 5 nF—for the voltage divider—without requiring transformer circuitry to obtain peak voltages of 1.4 times the peak value of the supply voltage. The voltage divider can be built of capacitor units of higher capacity, however, which may be desirable for interference suppression so that the very same capacitor units which function as the operative voltage divider to provide starting pulses, can also be used to suppress undesired interference—thereby permitting further savings in components.

The capacity value of a capacitor unit in the voltage divider to the capacity of the trigger capacitor should be in the order of between 1:1 and 1:5. A capacity relationship of 1:3 has been found particularly desirable. To start low-pressure discharge lamps, for example of the compact fluorescent type, or other discharge lamps which are difficult to start, high initial voltage must be provided. The triac should not become conductive, again, at too low a reverse voltage, in order to provide high peaks. This is readily obtained by arranging for a suitable time constant within the trigger circuit, readily possible by utilizing the capacitive voltage divider. A time constant of between 1 to 8 milliseconds, particularly between 4 and 6 ms, is desirable for the trigger circuit of the triac, formed by the charge resistor and the trigger capacitor.

Manufacturing tolerances of the various circuit elements may cause, in some extreme cases, lamp ignition depending on voltage polarity. This is undesirable, since the circuit should provide ignition pulses regardless of input polarity from an a-c network, and the voltage pulses or peaks should reliably switch between pulses regardless of polarities. To provide for polarity independence, a diode of random polarization bridged by a resistor can be located, in accordance with a feature of the invention, in the trigger circuit between the diac and the trigger capacitor.

The triac preferably should be protected, and in order to prevent excessively rapid rise in current, a high-frequency choke is included in the main current path of the triac, thus delaying or retarding the current rise upon conduction of the triac. It is, additionally, desirable to introduce a positive temperature coefficient (PTC) resistor in the main current-carrying path of the triac to protect the triac and especially the choke; if a lamp cannot be ignited at all, the starting cycles are interrupted after the PTC resistor reaches a high resistance level, for example in about 60 seconds.

The noise or radio interference suppression capacitor, usually used with starting circuits for fluorescent lamps, is no longer required, since the capacitative voltage divider can carry out the function of radio noise suppression. The overall capacity of noise suppression capacitors, required by IEC (International Electric Commission) Standard 155, should be between 5 to 20 nF, overall. Consequently, the capacity of each one of the capacitor units of the voltage divider should then be between 10 and 40 nF.

DRAWINGS:

FIG. 1 is a circuit diagram of the general circuit for starting a low-pressure fluorescent lamp; and FIG. 2 illustrates a modification and enlargement of the circuit in accordance with FIG. 1.

DETAILED DESCRIPTION.

Figure 1:
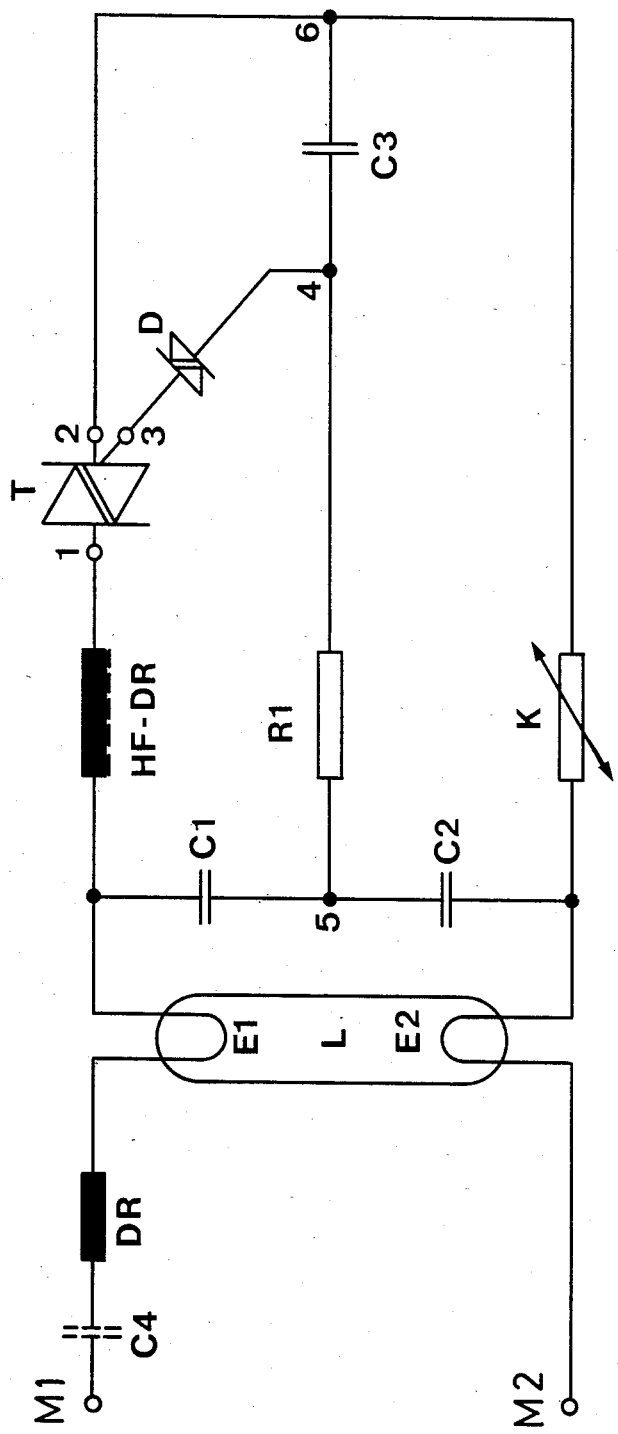

The starting circuit for a compact fluorescent lamp L of, for example, 16 W, is connected to two main current supply terminals M1, M2. The lamp L has two heatable electrodes E1, E2. A choke DR is serially connected with the electrode filament E1; a capacitor C4 may, additionally, be serially connected with the choke, and between it and the main current terminal M1.

A triac T is connected in parallel with the electrodes E1, E2 of the lamp, as shown. The triac, preferably, should have a peak blocking voltage of 700 V, and be capable of carrying a current of 3 A.

The triac T has its main current-carrying terminals 1, 2 serially connected with a high-frequency choke HF-DR, connected between the terminal of the electrode filament E1 which is remote from the main terminal M1. The gate or trigger electrode terminal 3 of the triac T is connected through a diac D to a junction point 4, between a charge resistor R1 and a charge capacitor C3, the other terminal of which is connected to a terminal 6, and hence to the main current-carrying terminal 2 of the triac T. The diac D has a switch-over voltage of 32 V. The charge resistor R1, for example, is of 68 K-ohms, and is connected at the terminal remote from junction 4 to a junction 5 forming the tap point of a purely capacitative voltage divider defined by two capacitors C1, C2. Each one of the capacitors C1, C2 has a nominal capacity value of 22 nF. The capacitor C3 forming part of the trigger circuit has a nominal capacity value of 68 nF. The high-frequency choke HF-DR has an inductance of 47 micro Henry. A PTC resistor K, with a nominal resistance value of 25 ohms, is serially connected between junction 6 and the terminal of electrode E2 remote from the second main terminal M2.

Figure 2:
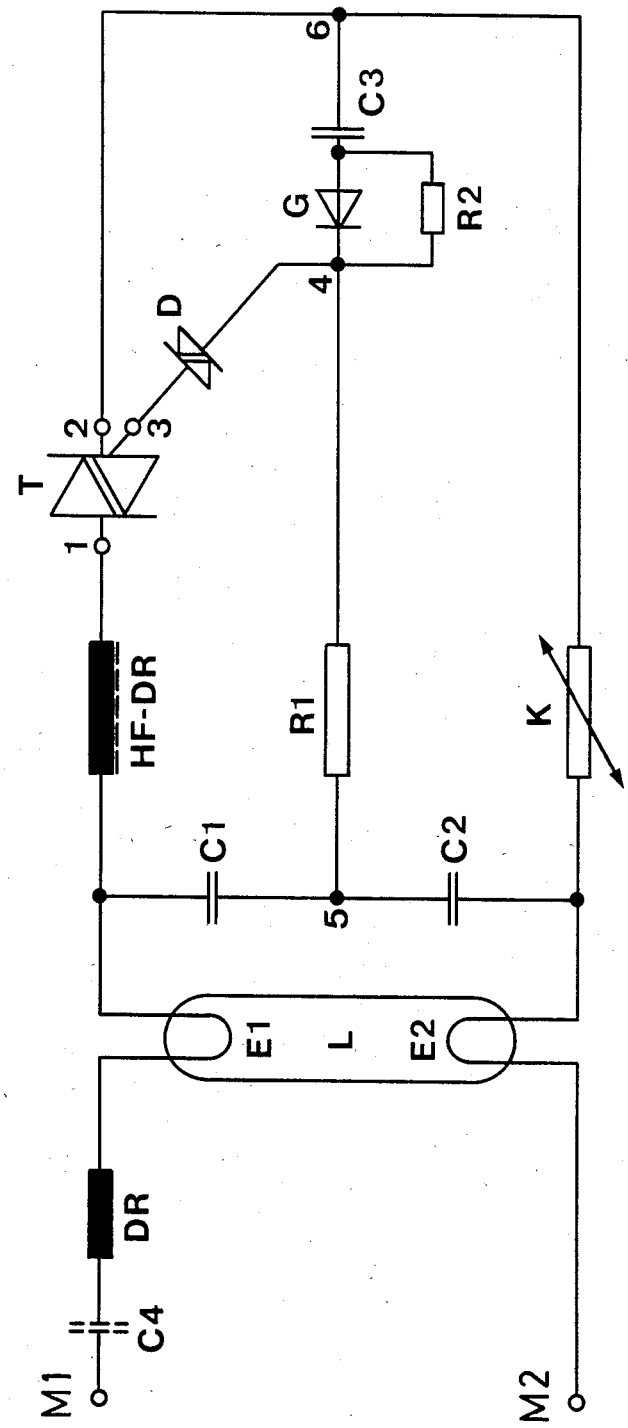

The circuit of FIG. 2 is identical, except that, in addition to the elements described, a diode-resistor circuit formed by a diode G, and a resistor R2, in parallel thereto, is connected between junction 4 and the adjacent terminal of capacitor C3. The resistor R2 has a value of, for example, 56 ohms nominal. The polarization of the diode G is not critical or important, and can be in either direction.

Operation: The ignition system has an asymmetrical, unstable operating condition. Let it be assumed that the terminals M1, M2 are energized with a power supply voltage of, for example, 50 Hz or 60 Hz, at, for example, 220 V. The supply voltage is divided by two in the ratio of 1:1, that is, in accordance with the capacity relationships of the capacitors C1, C2. Upon gradual increase of the supply voltage, the diac D will switch over, or become conductive, as soon as the trigger capacitor reaches the switching voltage of the diac. Upon conduction of the diac, the triac T will be rendered conductive. It is irrelevant whether the diac becomes conductive upon rise in voltage of the negative or positive half-wave; the switch-over of the diac to conduction depends on the instant of connection of the main terminals M1, M2 to a power supply network. The tolerances of the capacitors and differences in switching voltage of the diac with respect to positive or negative switching direction also will have some effect.

After first conduction of the diac, the capacitative voltage divider and the circuit formed by the resistor R1 and the trigger capacitor will become of low impedance value. Due to the long charge time constant, switch-over in reverse direction is not possible; switching, however, will occur again in the same direction, since recharge of the trigger capacitor in the trigger circuit requires less energy. Thus, the desired high preheating current in an inductive circuit is obtained.

The operating state, just described, is not stable, however, since the voltage relationships at the voltage divider C1, C2 change due to unequal removal of energy from the respective capacitors, until the triac T can switch through also in opposite direction. Thereafter, the voltage relationships will reverse so that the previously described sequence may repeat. This switch-over from one direction of conduction or one polarity to the other provides a high voltage pulse in both polarity directions which substantially assists firing of the lamp L, although it may be difficult to fire. The voltage peaks in both directions are of equal magnitude.

The phase control angle changes, in the ignition arrangement as described, in a specific rhythm. When using a circuit with the resistance, capacitance and inductance values as above referred to, the rhythm will have a frequency of about 3 Hz. The preheating current also changes with that frequency; the pulse voltages, also, will change with that frequency. The lamps, being thus pulsed at the rate of 3 Hz, will start reliably and starting failures are effectively prevented.

For 110V-60Hz operation, the circuit elements of the starting arrangement for low pressure discharge lamps, particularly fluorescent lamps of the compact fluorescent lamp type with not more than 20 W should have the following values:

triac T: 700V/3A; diac D: 32V; resistor R1: 90 kΩ; capacitors C1, C2:

33 nF; capacitor C3: 47 nF; high-frequency choke HF-DR: 47 μH;

PTC-resistor: 25Ω; resistor R2: 56Ω.

This means that the values of the capacitors C1, C2 have to be changed from 22 to 33 nF, the value of the capacitor C3 from 68 to 47 nF and the value of the resistor R1 from 68 kΩ in 90 kΩ.

The present starting arrangement is particularly adapted for use with a compact fluorescent lamp as described in U.S. Pat. No. 4,441,050 issued Apr. 3, 1984 to G. Steeger and J. Plischke.

Various changes and modifications may be made within the scope of the inventive concept.

We claim:

1. A ballast and starting circuit for a low-pressure discharge lamp (L) having heater electrodes (E1, E2) and a choke (DR) connected in series with said electrodes, said circuit including two main terminals (M1, M2);

a triac (T) having main current terminals (1, 2) connected in a circuit path parallel to the discharge path of the lamp and in series with the heater electrodes thereof;

wholly capacitive voltage divider, comprising two serially connected capacitor unit (C1, C2) of at least approximately equal value, connected in parallel to said lamp and having a voltage divider junction (5) located between said capacitor units;

a diac (D) having one terminal connected to the gate or control electrode (3) of the triac;

a control circuit for the diac including a charge resistor (R1) connected to the voltage divider junction (5) and to the other terminal (4) of the diac, and a trigger capacitor (C3) connected to the other terminal (4) of the diac and to one (2) of the current terminals (1, 2) of the triac, wherein, in accordance with the invention, said triac (T) and said capacitive voltage divider are connected in parallel to each other, such that said ballast and starting circuit operates substantially as a choke ballast when the circuit path containing said triac is substantially conductive and said circuit operates substantially as a choke-and-capacitor ballast when said triac (T) is non-conductive.

2. Circuit according to claim 1, wherein the relationship of capacity value of one capacitor unit (C1, C2) of the voltage divider and the capacity value of the trigger capacitor (C3) is between about 1:1 and 1:5.

3. Circuit according to claim 2, wherein said capacity relationship is about 1:3, whereby the trigger capacitor (C3) will have a value of capacity about three times the value of capacity of any one of the capacitor units (C1 or C2) of the voltage divider.

4. Circuit according to claim 1, wherein the control circuit for the diac (D) formed by the charge resistor (R1) and the trigger capacitor (C3) has a time constant of between 1 and 8 milliseconds.

5. Circuit according to claim 4, wherein said time constant is between 4 and 6 milliseconds.

6. Circuit according to claim 1, further including a circuit to provide for polarity independence comprising a diode (G) and a resistor (R2) connected in parallel thereto, said parallel diode-resistor circuit (G, R2) being connected between the second terminal (4) of the diac and the trigger capacitor (C3), and wherein the diode is of random polarization with respect to said other terminal (4) of the diac.

7. Circuit according to claim 1, further including a high-frequency choke (HF-DR) serially connected in circuit with the main current terminals (1, 2) of the triac.

8. Circuit according to claim 1, further including a PTC resistor (K) serially connected with the main current terminals (1, 2) of the triac.

9. Circuit according to claim 1, wherein the triac is connected to the electrodes (E1, E2) of the lamp (L) at terminal ends thereof remote from the circuit terminals (M1, M2).

10. Circuit according to claim 1, wherein the voltage divider formed by the capacitor units is connected to the electrodes (E1, E2) of the lamp at the terminal ends thereof remote from the main circuit terminals (M1, M2).

11. Circuit according to claim 9, wherein the voltage divider formed by the capacitor units is connected to the electrodes (E1, E2) of the lamps at the terminal ends thereof remote from the main circuit terminals (M1, M2).

12. Circuit according to claim 11, further including at least one protective circuit element serially connected with the main current terminals (1, 2) of the triac, said circuit protective element comprising at least one of: a high-frequency choke (HF-DR); a PTC resistor (K).

13. Circuit according to claim 1, wherein the combined capacity value of both capacitor units (C1, C2) defining the voltage divider, across the end terminals of the voltage divider, is between 5 and 20 nF, whereby each of said capacitor units will have a nominal capacity of between 10 and 40 nF.

14. Circuit according to claim 13, wherein the capacity value of the trigger capacitor (C3) is between 30 and 120 nF.

15. Circuit according to claim 14, wherein the time constant of the control circuit for the diac including the charge resistor (R1) and the trigger capacitor (C3) is between 4 and 6 milliseconds.

16. Circuit according to claim 15, further including a circuit to provide for polarity independence comprising a diode (G) and a resistor (R2) connected in parallel thereto, said parallel diode-resistor circuit (G, R2) being connected between the second terminal (4) of the diac and the trigger capacitor (C3), and wherein the diode is of random polarization with respect to said other terminal (4) of the diac.

* * * * *

UNITED STATES PATENT AND TRADEMARK OFFICE
CERTIFICATE OF CORRECTION

PATENT NO. : 4,588,925

DATED : May 13, 1986

INVENTOR(S) : FAHNRICH et al

It is certified that error appears in the above-identified patent and that said Letters Patent is hereby corrected as shown below:

Claim 1, column 5, line 43, insert "a" before --wholly--

Signed and Sealed this

Twenty-third Day of September 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,588,925
DATED : May 13, 1986
INVENTOR(S) : Hans-Jurgen Fahnrich et al.

It is certified that error appears in the above-identified patent and that said Letters Patent is hereby corrected as shown below:

Claim 1, column 5, line 25, "in" should read

-- to --.

Signed and Sealed this

Eleventh Day of November, 1986

Attest:

DONALD J. QUIGG

*Attesting Officer*      *Commissioner of Patents and Trademarks*